Figure 1:
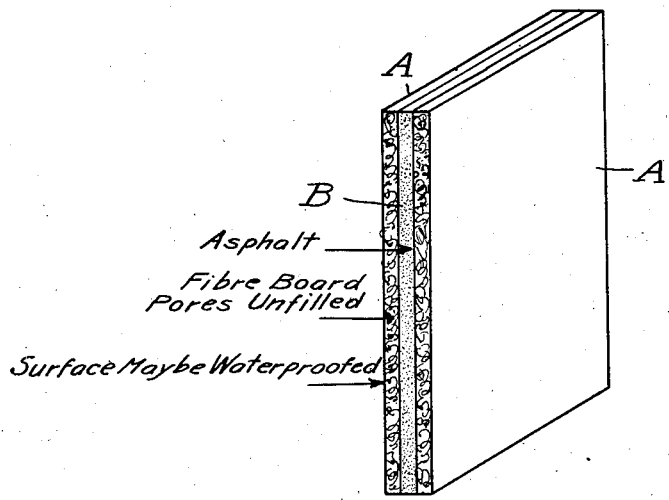

June 27, 1944.  A. C. FISCHER  2,352,314
CONSTRUCTION MATERIAL
Filed Feb. 3, 1941

Inventor,
ALBERT C. FISCHER

By, Knight Bros,
Attorneys.

Patented June 27, 1944

2,352,314

UNITED STATES PATENT OFFICE 2,352,314

CONSTRUCTION MATERIAL

Albert C. Fischer, Chicago, Ill.

Application February 3, 1941, Serial No. 377,257

6 Claims. (Cl. 94—18)

This invention relates to expansion joint slabs to be introduced in the space left between two sections of pavement or other like masonry, in order to provide an expansion joint thereat.

My present invention employs, in a preformed laminated or layer-formed expansion joint, a cold flow layer or core of plastic material and one or more housing or protective layers, preferably two layers applied to the respective sides of the core comprising bodies of inherently resilient fibers, and having the capacity of absorbing the mastic core and thereby partly reducing the cold flow and surface extrusion of the core material, also further reducing displacement of the mastic core by the condition of inherent resilient compressibility in the protective layer or layers, causing absorption of a substantial proportion of the pressure upon the joint of the thermally expanded masonry sections; and leaving such protecting portion of the composite slab, by its inherent resiliency, and under contraction of the masonry sections, self restoring to compressible condition and readiness for repeated functioning.

In the preferred embodiment of laminated expansion joint comprising a cold flowing core and collateral, resiliently compressible, protective layers, the protective layers are made of animal, vegetable or mineral material in fibrous, flakey or other inherently resilient form of subdivision, capable of being felted, matted, fabricated or otherwise collected into a layer of board, sheet, slab or other form; having a porous structure but sufficient mass integrity to admit of preforming transportation and manipulation into place of use; and provided, if desired, on some or all of its surfaces, by shallow impregnation or otherwise, with a surface toughening and waterproofing coat of elastic waterproof material such as rubberized mastic, sponge rubber, solid rubber, rubberized tape, latex, Bakelite, varnish, gelatin, bituminous glue, oily adhesive, etc.

In manufacturing this slab-like material for expansion joint purposes, the open-pore housing material is preferably fabricated in sheet form and placed on either side of the mastic core. Fibre board as manufactured for these joints, is quite brittle and breaks readily in handling. But, by placing it on either side of the mastic sheet, breakage is avoided; the material handles better in transportation to the job; it is more resilient in the pavement; and it oozes less than where felts are rendered flexible by saturation and a large body of mastic placed between them.

In the present invention the outer housing of fibrous material is free of solvent and the thickness and porosity of the material is relied upon to afford compressibility. This material if compressed ⅛ of an inch in thickness will return substantially to its original thickness when released. If compressed ¼ of an inch it will return to 90 percent of its former thickness. This is not true of the old style joints known as "sandwich joints" because under compression this cold flow ingredient immediately oozes and the slab cannot return to its former thickness.

Such materials as wood pulp board, any of the wall boards, or heavy thicknesses of felt are preferred because in the production of the subject matter of this invention they can be handled with better results. As stated, the sides may be waterproofed or not, but where they are waterproofed, the pores must remain open so that the material can readily be compressed. Any type of asphalt mastic may be utilized for the core or inner layer, and mastics containing fibers that are individually compressible will give even better results than where an all solid mastic is utilized.

If desired, those faces of the fibrous housing layers that are presented toward the mastic layer may be grooved so as to permit some of the mastic material to flow thereinto and further regulate the amount of mastic which extrudes at the surface of the joint.

Figure 2:
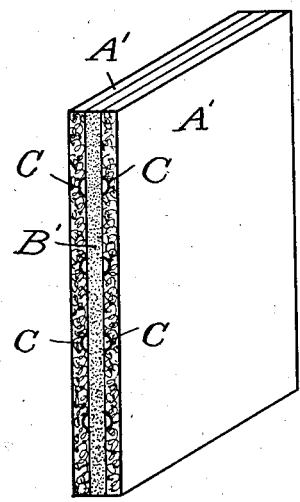
Figure 3:
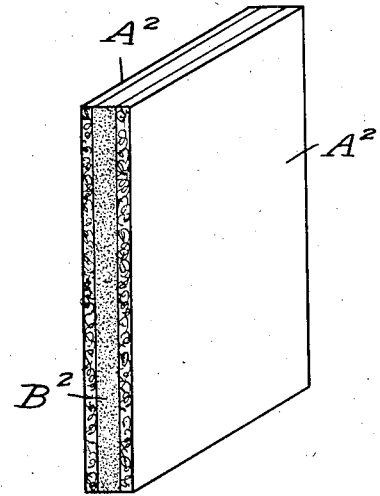

In the accompanying drawing Figures 1, 2 and 3 show three embodiments of the invention in perspective. Figure 1 illustrates porous waterproof housing sides A and a mastic core B. This core may be sponge rubber, cork rubber, cork, or a plastic material containing a fibrous or a cellular filler. The sides of the material may be formed from such fabricated boards as Maizewood, Celotex, gypsum board; any of the masticated wood pulp boards; or any of the felts of stiff and thick dimension.

In Figure 2 the fibre sides A' and core B' are the same as in the sides A and core B in Figure 1, except that grooves C are provided in sides A' for extrusion of the mastic material or other cold flow material which may be used in the core B' of the composite slab produced. In Figure 3 is illustrated a composite slab having a mastic core B2 which is made of sponge rubber and of greater thickness in proportion to the sides A2 than in Figures 1 and 2. However, any of the cores B, B1, B2 may be made of any of the products herein enumerated. The sides of the construction shown in Figure 3 may be prepared from ⅛ inch thick slabs of fibrous material where the core is of sponge rubber and they may be waterproofed or not as may be desired, so long as they are left in an unfilled or porous condition. Even one inch thicknesses of pulp board or of heavy grade felt may also be utilized for this purpose. Such materials are entirely different in function from the thin layers of waterproofing paper heretofore used in this art and which papers were completely filled with a saturant.

Waterproofing may be applied to the porous sides of the housing layers, in the form of a solvent such as mineral spirits, with an asphalt content of 35 to 40 percent; or the waterproofing medium may be any of the polymerized oils, or waterproofing soaps; or any of numerous other saturants known to be suitable for waterproofing, provided the quantity be materially less than that which would completely fill the pores and destroy resiliency; or provided the consistency or physical condition of the waterproofing medium be such that it will seal the pores at the surface without unduly penetrating the body of the fibrous layer.

Composite material embodying this invention is prepared in sheets and cut to sizes appropriate for use in building structures, paving joints, or other situations where compensation for thermal expansion and contraction is desirable, and where preformation, ready for installation is permissible. As can be readily understood, the porous outer layers, by reason of their central plastic layer will not only be stronger, and better adapted for handling without breakage, but the insertion of a completely impervious layer between two porous but exteriorly waterproofed bodies lends valuable functional qualities for construction purposes.

The three layers of material comprised in the composite slab are adhered together into a unitary structure, for instance, by reducing to adhesive state, the two faces of the cold flowing asphaltic core and pressing there against the faces of the fibrous housing layers, preferably in bare and absorbent state; the faces of the mastic core being rendered adhesive in any of several ways, for instance by vulcanization, when the core is wholly or largely of rubber; by temporary fusion of said faces and letting them "freeze" by cooling; by application thereto of a solvent that will become dissipated and permit setting; or by applying an independent adhesive having affinity for both the mastic and the fibrous materials. After this assembly is complete, surfaces remaining exposed, of the composite slab may be waterproofed by applying thereto suitable materials such as those herein mentioned, and the selected consistency of which will determine the degree of its penetration beyond the surface pores which it seals.

While I have herein described the best way known to me of realizing the results of my invention, I do not wish to be limited to the specific disclosures herein selected for purposes of illustration, since these embodiments may be modified or added to in various ways, or modified by the use of many different saturants, types of porous material, and types of plastic core without departing from the principle of the invention.

The present application is a continuation in part of my application Serial No. 243,004, filed November 29, 1938, for Expansion joints, in Figure 6 of which is disclosed a laminated expansion joint comprising a middle layer of cold flowing asphaltic material and two collateral protective layers of rubber, described alternatively as solid rubber or sponge rubber and inherent in which are the functions, inter alia, of absorption, in the compressible rubber protective layers, of a proportion of the pressure imposed by thermally expanded paving sections between which the expansion joint may be used and reexpansion of such protective layers in readiness for reuse, when such pressure is relieved by contraction of the masonry under lowering temperature.

I claim:

1. A laminated packing for structural members, said packing comprising a core layer of sponge rubber material of substantial thickness and a pair of porous protective layers applied to the faces of said core having a thickness comparable to that of the core; said protective layers having their pores free and unobstructed and leaving said protective layers highly compressible.

2. A laminated packing for structural members comprising a pair of protecting layers and an intervening layer of sponge rubber material between said protecting layers said three layers being of substantial similar thickness; said protecting layers being structurally highly porous, having their pores unobstructed and being resiliently compressible and said core being adhered to and imparting physical strength to said protecting layers.

3. A packing as described in claim 2 in which exposed surfaces of the protecting layers are waterproofed but have their pores left unobstructed.

4. Laminated packing for structural members, said packing comprising a layer of deformable waterproof-material of substantial thickness forming a core for the packing and alternated therewith, resiliently compressible protective material also in the form of a layer having a thickness comparable to that of the core; said protective material comprising a body of inherently resilient fibers in matted form and having pores defined by its constituent fibers; said fibers being non-adhering and readily movable one upon another and leaving the body freely deformable under compression and its pores freely penetrable by flowable mastic and having the capacity to absorb a substantial proportion of the pressure imposed upon the packing when in use and thereby reduce displacement of the material of the deformable core, a face of the protective layer presented against a face of the core being grooved to provide a recess into which that portion of the material of the core that is in excess of the portion absorbed by the porous faces of the fibrous bodies may escape under displacing pressure imposed upon the packing when in use.

5. Laminated packing for structural members, said packing comprising a layer of sponge rubber of substantial thickness forming a core for the packing and alternated therewith, resiliently compressible protective material also in the form of a layer having a thickness comparable to that of the core; said protective material comprising a body of inherently resilient fibers in matted form and having pores defined by its constituent fibers; said fibers being non-adhering and readily movable one upon another and leaving the body freely deformable under compression and its pores freely penetrable and having the capacity to absorb a substantial proportion of the pressure imposed upon the packing when in use and thereby reduce displacement of the material of the deformable core.

6. Laminated packing as described in claim 5, in which the body of resiliently compressible protective material is in two layers on opposite outer faces of the sponge rubber layer that forms the core; the core is adhered to the porous surfaces of the bodies of protective material substantially throughout their meeting faces; waterproofing is applied to the faces of the protective bodies that are remote from the core and said protective layers are strengthened by the core, against fracture in manipulation.

ALBERT C. FISCHER.